May 5, 1959  DE WITT A. HERRON  2,885,077
DRY SEPARATORS

Filed Oct. 7, 1954  3 Sheets-Sheet 1

INVENTOR.
DeWitt A. Herron
BY
Horace B. VanValkenburgh
ATTORNEY

May 5, 1959 DE WITT A. HERRON 2,885,077
DRY SEPARATORS
Filed Oct. 7, 1954 3 Sheets-Sheet 2

INVENTOR.
DeWitt A. Herron
BY
Horace B. Van Valkenburgh
ATTORNEY

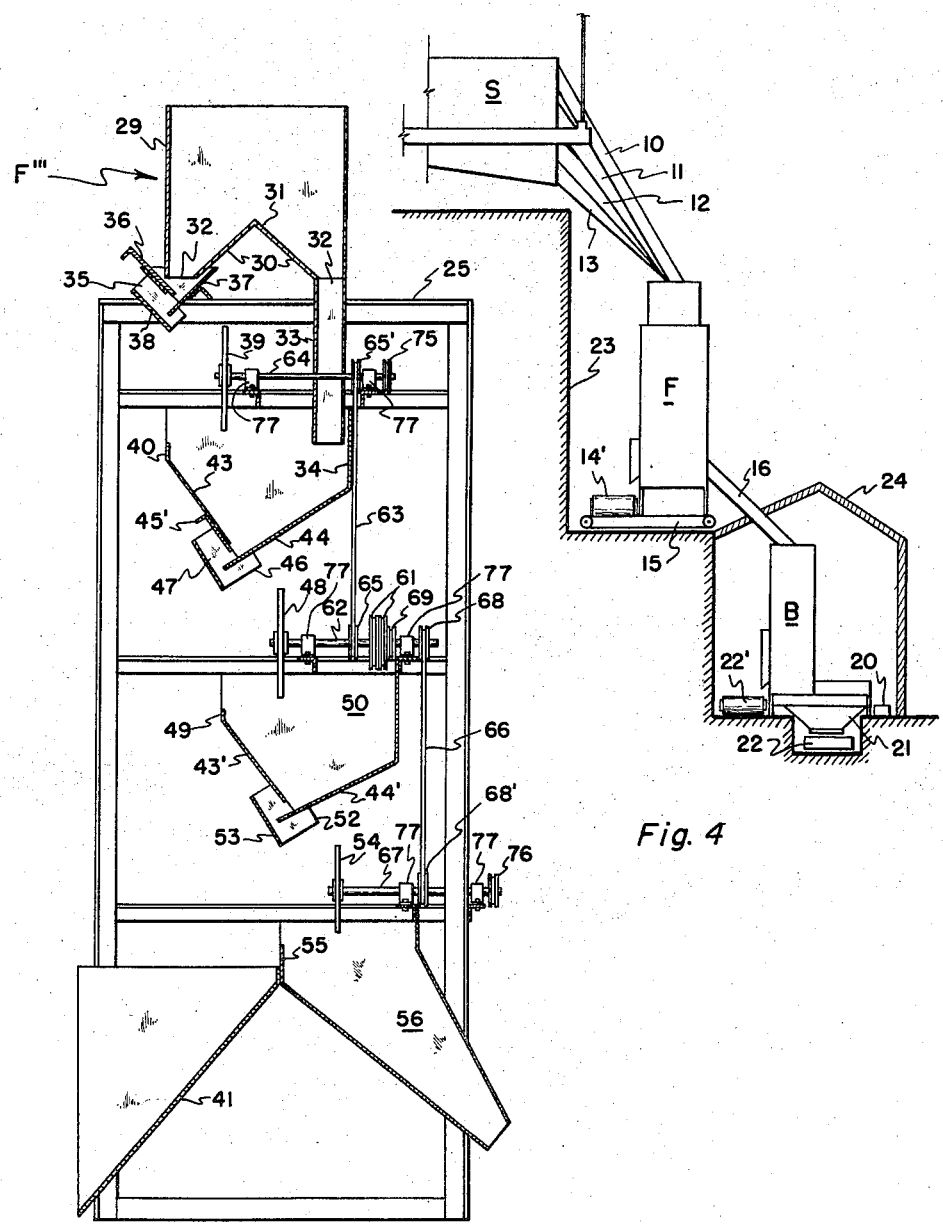

United States Patent Office 2,885,077
Patented May 5, 1959

2,885,077

DRY SEPARATORS

De Witt A. Herron, Englewood, Colo., assignor to Colorado Dry Concentrator Company (a trust); L. Bernard Davis, Denver, Colo., executive trustee Application October 7, 1954, Serial No. 460,957

7 Claims. (Cl. 209—133)

This invention relates to dry separators and more particularly to a dry separator for treating ore particles, finely divided sand, or the like, to separate heavier particles from lighter particles, and thereby recover a valuable constituent, such as free gold or gold bearing ore.

In the separation of heavier valuable particles, such as gold, from sand, ore, or other material containing the same, particularly when the amount of valuable product is relatively small in comparison with the total amount of material to be treated, water has been almost universally utilized in the separation operations and water is also used to move the material to be treated to and from the separating apparatus. Thus, shaking or centrifugal devices generally require water, while when flotation and similar methods and apparatus are used in the separation of valuable particles from finely ground ore, water is necessary. However, there are numerous places, particularly in very arid or desert regions, where the supply of water is scarce or non-existent. In some of these regions, there are sands and the like which contain particles of free gold or other particles of value which may be present in very small amounts. To transport the entire material to a location at which a sufficient supply of water is available is usually so prohibitive in cost as to be unthinkable. Similarly, the transportation of a sufficient amount of water to the location of the gold or other valuable bearing deposit is again prohibitive in cost. Thus, the need exists for a method and apparatus by which gold or other valuable particles can be separated, particularly when occurring in relatively small quantities, without the necessity for the use of any water.

Among the objects of the present invention are to provide a novel method and apparatus for separating heavier particles from lighter particles, in the dry state; to provide such a method and apparatus which can be operated sufficiently economically as to be feasible for operation; to provide such a method and apparatus which will effectively separate gold and other valuable particles, thereby producing a final product which is relatively free of less valuable material and also producing waste or tailings which contain a minimum amount of valuable particles; to provide such a method which may be controlled readily; to provide such apparatus which will effectively carry out the method and which may be constructed at a relatively reasonable cost; to provide such apparatus which operates effectively and efficiently; to provide such apparatus which requires a comparative minimum of attention; to provide such apparatus which may be adjusted to accommodate variations in recovery conditions, including particle size, specific gravity and other properties of the material to be treated; to provide such apparatus which will effectively handle material which varies in particle size; and to provide such apparatus which may be operated at a relatively low cost, in comparison with the value of the material recovered. Additional objects and the novel features of this invention will become apparent from the description which follows, taken in connection with the accompanying drawings, in which:

Fig. 3 is a transverse vertical section, on an enlarged scale and taken along line 3—3 of Fig. 2;

Fig. 4 is an end elevation outline, on a smaller scale, of the apparatus of Fig. 1;

Figure 1:
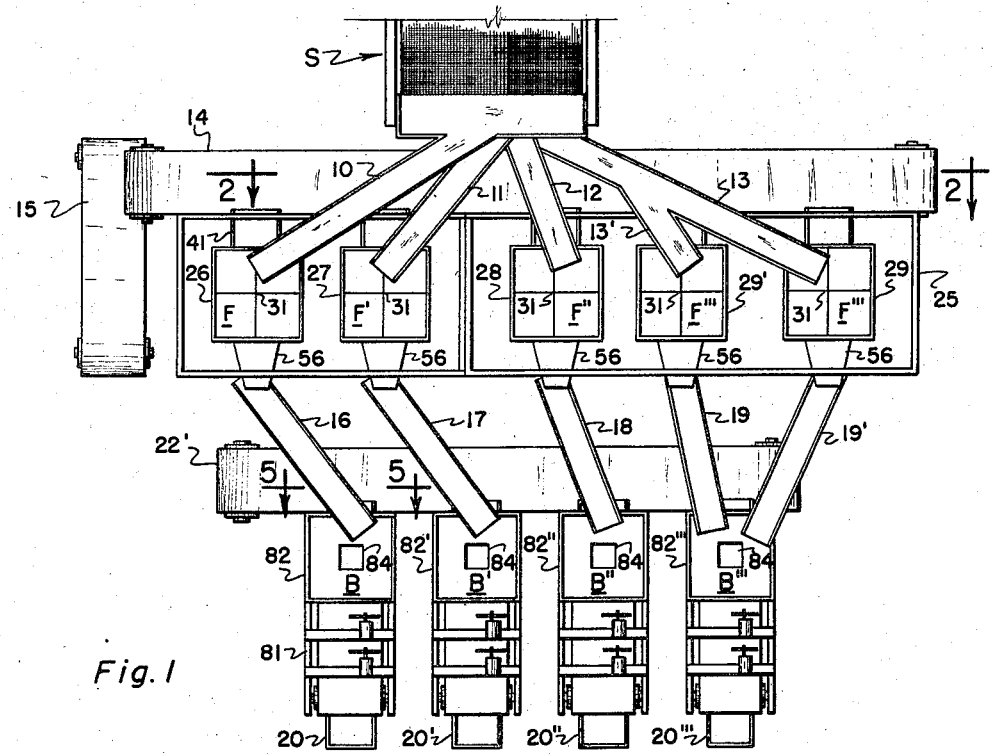
Fig. 1 is a top plan view of apparatus constructed in accordance with this invention and particularly adapted to carry out the method thereof.

Although the method and apparatus of this invention are applicable to other materials and deposits, the treatment of a gold bearing sand from a deposit near Oro Grande, New Mexico, will be taken as representative. These sands are natural and test sampled, ranged in particle size as in Table I below, the percentage being by weight.

*Table I*

| Size | Sample No. 1 | Sample No. 2 | Sample No. 3 | Average |
|---|---|---|---|---|
| | Percent | Percent | Percent | Percent |
| $+\frac{1}{4}''$ | 37.6 | 45.0 | 38.2 | 40.2 |
| $-\frac{1}{4}''+\frac{1}{4}''$ | 8.5 | 9.2 | 12.5 | 10.6 |
| $-\frac{1}{4}''+\frac{1}{8}''$ | 9.3 | 9.9 | 9.8 | 9.7 |
| $-\frac{1}{8}''+12$ | 11.8 | 10.5 | 10.4 | 10.8 |
| $-12+20$ | 8.7 | 7.9 | 6.4 | 7.6 |
| $-20+30$ | 6.7 | 4.8 | 4.8 | 5.3 |
| $-30+40$ | 4.0 | 2.5 | 3.3 | 3.2 |
| $-40$ | 13.5 | 10.4 | 15.0 | 13.0 |
| Total | 100.1 | 100.2 | 100.4 | 100.3 |

It will be noted that a $\frac{1}{8}''$ screen size corresponds to 6 mesh, so that the particles ranging in size $-\frac{1}{8}''+12$ may also be termed $-6+12$ mesh.

The gold in the above sands occurs both in the form of free flakes, and in the form of a black sand which contains the gold in chemically combined form, the total value of which may vary from $1.00 to $30.00 per cubic yard and may average about $3.00 per cubic yard. In the case of the larger particles, above 8 mesh, these may be crushed to a sufficiently small size that they can be more effectively treated, such as to $-8$ mesh, or even smaller, if necessary, to free the gold and gold-bearing particles. It is evident that the cost of treating such a relatively wide range of particles, as by grinding to a relatively uniform particle size and then treating, as by shaking table, flotation or other process involving water, would be prohibitive in cost if the water were transported to the site of the deposit. Also, due to the small percentage of gold contained therein, the cost of transporting the sand to a location in which sufficient water is available would also be prohibitive.

In accordance with the present invention, the material to be treated is crushed or similarly treated to reduce the maximum size of particles to a size, such as $-6$ mesh, which can be effectively handled and separated in dry form, the over-size particles being screened out and returned to the crusher. The particles $-6$ mesh and below are then separated, as by a triple-deck shaking screen, or other suitable apparatus, so as to produce several sizes or ranges of particles, each of which may be treated as a batch, such as from $-6$ to $+12$ mesh, from $-12$ to $+20$ mesh, from $-20$ to $+30$ mesh and $-30$ mesh.

Other ranges of particle sizes may be chosen, although the variation in particle size for each batch separated out is preferably chosen in accordance with the size of the particles in each range, such as so that the largest particles generally are no more than twice the size of the smallest particles in each batch. In this way, an adequate separation of the heavier particles from the lighter particles of each batch may be obtained.

In further accordance with this invention, each batch of particles is subjected to one or more series of treatments in which the particles are distributed across a predetermined area and fall downwardly and in a direction inclined toward, or making an obtuse angle with, the direction of movement of a current of air, which is travelling substantially horizontally. The inclination of the falling particles is an important feature of the method of this invention, since adequate results have not been secured without it. The current of air moves the lighter particles a greater distance than the heavier particles, and the lighter particles are separated from the heavier particles along a line adjacent the lower portion of the air current.

More than one such treatment may be required to eliminate a substantial portion or a large majority of the lighter particles and the resulting product, from each batch so treated, is then subjected to a final step in which the particles are moved as a layer along a substantially horizontal path, with one or more currents of air directed against them at an angle to the layer of particles and also moving opposite to the direction of movement of the layer of particles. By this final step, gold flakes have been separated of sufficient purity so as to be capable of being taken directly to the mint, while ore particles containing gold, principally in chemical combination, are also separated out as a concentrate which may be taken directly to a smelter.

As will be evident, the steps outlined above cooperate with each other to produce the final result, i.e., separation of free gold, separation of ore particles having a gold content, and the elimination of tailings, such as non-gold bearing sand.

The apparatus of this invention is particularly adapted to carry out the above described method, such as applied to the gold bearing sands referred to above, and may comprise, as illustrated in Figs. 1 and 4, a conventional shaking screen S or other suitable device for separating or dividing the particles into appropriate ranges of sizes for further treatment of each batch, such as indicated previously. The feed to the shaking screen S may be by belt conveyor, from a hopper loaded by trucks, bulldozers, and the like, or from a conventional crusher and screen (not shown) which reduces the largest particles to not more than −6 mesh. After excavation, the sand may be passed through a trommel screen which separates out particles over ¼ in. in size, although such larger particles may be crushed, if gold-bearing.

From the shaking screen S, the larger particles, such as −6 to +12 mesh may pass as by gravity along a duct 10 to a fan separator F; the next smaller particles, such as −12 to +20 mesh, pass along a duct 11 to a fan separator F'; the next smaller particles, such as −20 to +30 mesh, pass along a duct 12 to a fan separator F''; while the smallest particles, such as −30 mesh, pass along a duct 13 and a branch duct 13' to a pair of fan separators F'''. It is to be noted that, in the case of gold-bearing sands at the location above described, the amount of smallest particles is sufficiently greater than the amount of particles in the other size ranges so that two fan separators F''' are utilized, whereas only one fan separator is utilized for the other size ranges. It will be understood, of course, that when other sands or other material, which may differ in the amount of particles in each range of sizes, chosen for the optimum operating characteristics, may require a different number of fan separators, such as only one for the smallest size and more than one fan separator for one or more of the larger sizes. The lighter particles, i.e., waste or tailings, removed by the fan separators F, F', F'' and F''' may be discharged onto a belt 14, which extends along the rear of the fan separators and moves the waste or tailings to a point of discharge, such as a waste discharge belt 15.

The fan separators, including fan separator F, are described in greater detail hereinafter, but essentially the heavier particles concentrated by these fan separators may be passed through a series of belt separators for the final separation step. Thus, the concentrate from fan separator F may pass, as by gravity, through a duct 16 to a belt separator B; the concentrate from fan separator F' may pass through a duct 17 to a belt separator B'; the concentrate from fan separator F'' may pass through a duct 18 to a belt separator B''; and the concentrate from fan separators F''' may pass through ducts 19 and 19' to a belt separator B'''. It will be understood, of course, that the belt separators for each size may vary in accordance with the quantity of concentrate to be treated by each. It will be noted that the amount of concentrate from the two fan separators F''', for the smallest size, i.e., −30 mesh, is sufficiently small in quantity that it can be handled by a single separator B''', although the number of belt separators may again be varied in accordance with conditions.

The concentrate from the fan separators F, F', F'' and F''' consists of a relatively large amount of free gold and gold-bearing particles found with a smaller amount of waste or tailings. Thus, each belt separator B, B', B'' and B''', may include one or more separation stages similar to the fan separation stages of fan separators F, F', F'' and F''', together with a final belt separation step, each being described in greater detail hereinafter.

Figure 5:
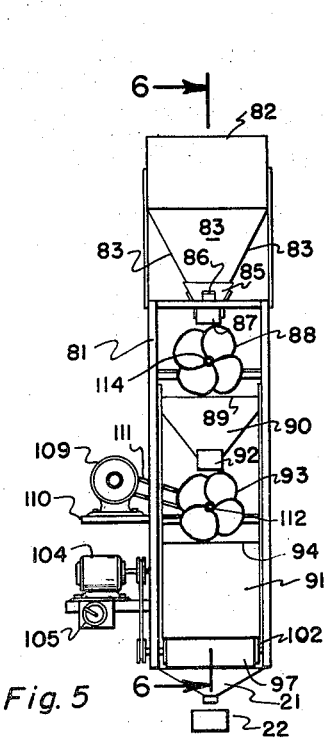
Fig. 5 is an end elevation of one of a series of belt separating units forming another portion of the apparatus of Fig. 1, on an enlarged scale and taken from the position of line 5—5 of Fig. 1.
Figure 6:
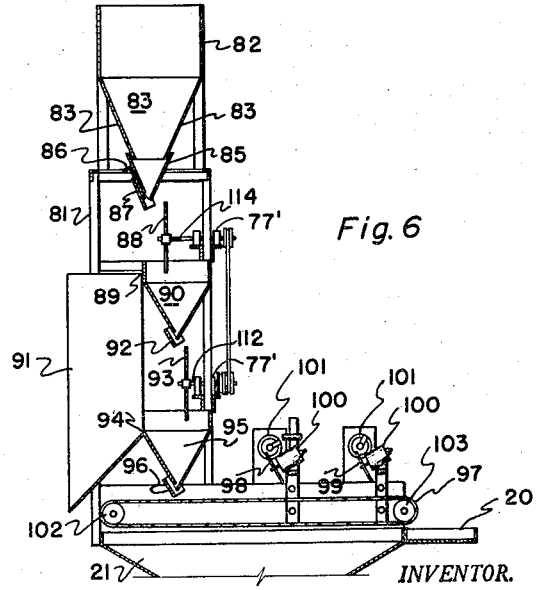
Fig. 6 is a vertical section of the unit shown in Fig. 5, taken along line 6—6 of Fig. 5.

The free gold separated by the belt separators B, B', B'' and B''' may be collected in a pan 20, 20', 20'' and 20''', respectively, for collection at periodic intervals and storage for safe keeping, while the gold concentrate, i.e., gold-bearing particles which may be separated by the belt separators B, B', B'' and B''', may be collected beneath each belt separator, as in a trough 21 of Figs. 4, 5 and 6, and removed by a belt 22 for storage and periodic shipment to a smelter or other suitable treatment. Lighter particles or tailings separated by separators B to B''', inclusive, may be collected by a belt 22' for disposal. As shown in Fig. 4, a foundation 23 or other suitable means for support, as at the edge of a cliff or bank, may be provided so that shaking screen S is located at a higher elevation, fan separators F, F', F'' and F''' at an intermediate elevation and belt separators B, B', B'' and B''' at a lower elevation, so that easy flow by gravity through ducts 10 to 13, inclusive, and ducts 16 to 19, inclusive, is secured. Of course, the various portions of the apparatus may be installed at substantially the same elevation and upwardly extending belt conveyors or other suitable types of conveyors substituted for each of the ducts, but gravity flow as described above involves less initial and operating costs and also simplifies the installation. In view of the value of the free gold flakes collected in pans 20, 20', 20'' and 20''' and also the value of the concentrate collected in troughs 21, the belt separators, B, B', B'' and B''' may be enclosed by a stout enclosure, such as a building 24, as indicated in Fig. 4, so that the final separation operations may be carried out under lock and key. Of course, the entire plant may be housed in a building, if desired, although operations in arid country may not require building protection for all operating parts.

Figure 2:
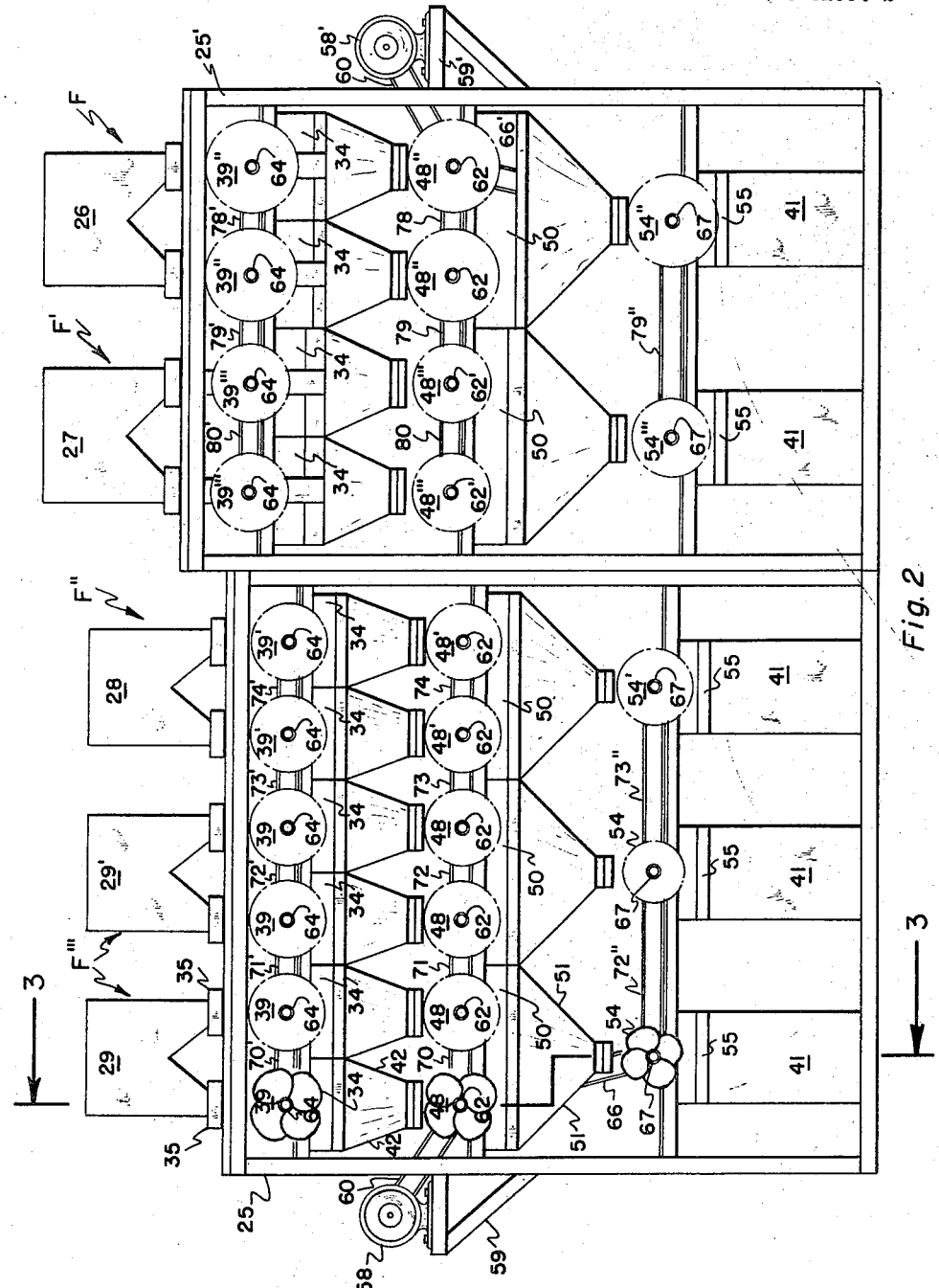
Fig. 2 is a side elevation of a series of fan separating units forming a portion of the apparatus of Fig. 1, taken from the position of line 2—2 thereof.

As illustrated in Figs. 2 and 3, the fan separators F, F', F'' and F''' may be mounted on a framework 25, formed of suitable angles, bars, channels and the like, attached together as by welding or bolts. Because of the larger size of the various hoppers and fans involved in the separators F and F', these may be mounted on a higher portion 25' of the framework, as in Fig. 2.

Each of the separators F, F', F" and F'" may be similarly constructed, in a manner substantially identical to the end separator F'", which is shown in section in Fig. 3. The duct 10 discharges particles into a hopper 26 of the separator F, duct 11 into a hopper 27 of separator F', duct 12 into a hopper 28 of separator F", and ducts 13 and 13' each into hoppers 29 and 29', respectively, of separators F'", these hoppers being conveniently mounted on the upper end of the framework. Each of the hoppers 26 to 29, inclusive, and 29', may be rectangular in cross section on the outside, but at the bottom provided with four distributing legs formed by angularly disposed plates 30 of Fig. 3, the inner edges of which may be welded or otherwise attached to the sides of the respective hoppers and the inner edges similarly attached to each other at the top of a cross joint 31, as in Fig. 1. In addition, each of the plates 30 is provided with a rectangular opening at the lowest point thereof forming an outlet 32, as in Fig. 3, at each of the four corners of the respective hoppers. Thus, the particles flowing into each of the hoppers 26 to 29, inclusive, and 29', are divided into four substantially equal parts, two of which are discharged through outlets 32 at the front end of the respective hopper at each side, while the other two parts are discharged through the rear outlets 32 and a conduit 33 into an intermediate hopper 34. The particles discharged through the front outlets 32 fall into a chute 35 which has vertical side walls, a gate 36 and a back plate 37 inclined oppositely to gate 36 and extending at its lower end past gate 36. The lower edge of gate 36 is manually spaced from rear plate 37 to form an opening for restricted discharge against a baffle 38, which may be mounted between the side walls of chute 35 and inclined at a suitable angle, such as 35°, to direct the flow of descending particles at an angle toward or an obtuse angle with the direction of movement of a current of air propelled by a fan 39 in a substantially horizontal direction. This inclination of the particles toward the current of air is an important feature of this invention, since adequate results have not been secured without it, as indicated previously. The current of air produced by fan 39 blows lighter particles forwardly past a front ledge 40 of hopper 34, these lighter particles falling downwardly past the hopper into a collecting trough 41 mounted at the lower end of the framework 25. The heavier particles, which are not moved past ledge 40 by the current of air produced by fan 39, fall into hopper 34 and there join the part of the particles from hopper 29 which have moved downwardly through conduit 33. Thus, the amount of material flowing downwardly past fan 39 will not be greater than the optimum capacity of the current of air produced by fan 39.

Hopper 34 may have vertical walls at the rear and sides along the upper portion thereof, with ledge 40 in front, and lower tapering side walls 42, as in Fig. 2. As in Fig. 3, the bottom of the hopper 34 may be formed as a trough and include a front plate 43 inclined inwardly and downwardly, with the lower end thereof spaced from an inwardly and forwardly inclined rear plate 44, the lower end of which extends beyond the spaced lower edge of plate 43. A gate 45' may be mounted between the vertical side walls of a chute 46 to regulate the opening through which particles move along rear plate 44, which particles are discharged against a baffle 47, which in turn directs the particles toward the direction of movement of a current of air produced by a fan 48. The lighter particles are again moved forwardly past a vertical front ledge 49 of a lower hopper 50, and fall into collecting trough 41, fan 48 thus producing an additional separation between lighter particles and heavier particles, the latter of which fall into hopper 50. Hopper 50 may be constructed similarly to hopper 34, i.e., provided with upper vertical walls at the rear and each side and with lower converging side walls 51. As before, the bottom of the hopper 50 may be formed by a front plate 43' and a rear plate 44', with the lower end of plate 43' being spaced from plate 44' and the lower edge of plate 44' extending past plate 43' and between the vertical side walls of a chute 52. Also as before, the particles discharged from the end of plate 44' are directed by a baffle 53, mounted between the side walls of chute 52, toward the direction of movement of a current of air produced by a fan 54, which current of air blows lighter particles forwardly past a ledge 55 which separates the upper ends of a collecting trough 41 for the lighter particles and a trough 56 for the heavier particles. As indicated previously, the lighter particles collected in each of the troughs 41 are discharged onto belt 14, while the heavier particles received by troughs 56 are discharged into the respective ducts 16, 17, 18, 19 and 19'.

The fans 39, 48 and 54 may be driven in any suitable manner, such as by motors 58 and 58', mounted on brackets 59 and 59', respectively, in turn mounted on the framework 25 and the framework portion 25', respectively. The motor 58 may be utilized in driving all of the fans for the separators F" and F'", while the motor 58' may drive the fans for the separators F and F' in a similar manner, as by dual V-belts 60 of Fig. 2. The V-belts 60 from motor 58 engage a pair of pulleys 61 on a shaft 62 for fan 48, while a V-belt 63 drives a shaft 64 for fan 39 through pulleys 65 and 65', mounted respectively on shafts 62 and 64. Another V belt 66 drives a shaft 67 for fan 54, through pulleys 68 and 68', respectively mounted on shafts 62 and 67. A pulley 69 of Fig. 3, on the first shaft 62, is engaged by a horizontal V belt 70 of Fig. 2, which drives the shaft 62 for the second fan 48 of the end fan separator F'". Similarly, horizontal V belts 71, 72, 73 and 74 connect the successive shafts 62 for the fans 48 of the second fan separator F'" and fans 48' of the separator F". Similarly, a pulley 75 on shaft 64 for the first fan 39, as in Fig. 3, engages a V belt 72' of Fig. 2 to drive the shaft 64 for the next fan 39, while belts 73', 74', 75' and 76' connect by pulleys on each of the respective shafts 64 to drive the shafts 64 for fans 39 and 39' of the second separator F'" and separator F". Similarly, a pulley 76 on shaft 67, as in Fig. 3, drives the shaft 67 for fan 54 of the second separator F'" through a V belt 72" of Fig. 2, while a similar V belt 73" drives the shaft 67 for fan 54' of separator F". The shafts 62, 64 and 67 may be mounted in a suitable manner on the framework 25, as by bearings 77 of Fig. 3.

The V belts 60 driven by motor 58' similarly drive shaft 62 for the first fan 48" of the separator F, while a vertically disposed V belt located similarly to belt 63 of Fig. 3 drives the shaft 64 for the first fan 39" of separator F and a V belt 66' drives the shaft 67 for the lower fan 54" of separator F. As before, horizontal V belts 78, 79 and 80, through suitable pulleys mounted on shafts 62 and 62', drive the second fan 48" of separator F and the fans 48" of separator F'. Also, horizontal V belts 78', 79' and 80' drive the second fan 39" of separator F and the fans 39'" of separator F', while a horizontal V belt 79" drives fan 54'" of separator F' through suitable pulleys mounted on shafts 67.

It is to be noted that there are two hoppers 34 for each of the separators, but only one hopper 50, due to the fact that by the time the heavier particles reach hopper 50, the amount of material moving past the fans 54 to 54'", inclusive, has been reduced, due to the removal of lighter material by the fans thereabove. The size and speed of the fans of the various fan separators F to F'", inclusive, for the sand referred to above, may conveniently be chosen as in Table II below, in which fans 39 to 39'" are indicated as upper fans, fans 48 to 48'" are indicated as intermediate fans and fans 54 to 54'" are indicated as lower fans.

Table II

| Separator | F | F' | F'' | F''' |
|---|---|---|---|---|
| Upper Fans: | | | | |
| Dia. inches | 12 | 10 | 10 | 10 |
| R.p.m. | 1,750 | 1,750 | 1,150 | 1,000 |
| Intermediate Fans: | | | | |
| Dia. inches | 12 | 10 | 10 | 10 |
| R.p.m. | 1,750 | 1,750 | 1,150 | 1,000 |
| Lower Fans: | | | | |
| Dia. inches | 12 | 10 | 10 | 8 |
| R.p.m. | 1,750 | 1,750 | 1,150 | 1,000 |

It will be understood, of course, that other sizes and speeds of fans may be utilized, depending upon the range of particle sizes for each batch, the amount of material in each batch, the degree of separation desired and other factors which may influence the design and operation of the apparatus.

The various parts of each of the belt separators B to B''', inclusive, may be mounted on a framework 81 formed similarly to framework 25. As illustrated in Fig. 1, the concentrate from duct 16 flows into a hopper 82 of belt separator B; the concentrate from duct 17 flows into a hopper 82' of belt separator B'; the concentrate from duct 18 flows into a hopper 82'' of belt separator B''; and the concentrate from ducts 19 and 19' flows into a hopper 82''' of belt separator B'''. As indicated previously, each of the belt separators may be constructed similarly to belt separator B, which is illustrated in greater detail in Figs. 5 and 6. Thus, hopper 82 may have upper vertical sides and lower converging sides 83 which terminate in an outlet 84, as in Fig. 1, from which the material flows into a box chute 85 which is provided with a gate 86 for regulating the flow of particles. The chute 85 is also provided with an inclined, bottom baffle 87 which directs the falling particles toward the direction of movement of a current of air produced by a fan 88, which blows the lighter particles past a ledge 89 of a hopper 90. The lighter particles fall downwardly into a trough 91 and thence onto belt 22' of Fig. 1, while the heavier particles fall into hopper 90 which has converging sides terminating at an outlet through which the particles flow into a box chute 92, to be directed toward the direction of movement of a current of air produced by a fan 93. This current of air blows the lighter particles past a ledge 94 which separates trough 91 and a lower hopper 95, the lighter particles falling into trough 91 and the heavier particles falling into hopper 95 for flow through a distributing chute 96 onto a belt 97, the upper reach of which is moving in a direction toward fans 98 and 99. Fans 98 and 99 are conveniently provided with radially extending blades and the axis of each fan is placed closer to the edge of belt 97 which is first approached by the fan blades as they move around beneath the fan axis, to equalize the distribution of air across the belt. Thus, when the fans are rotating in a counter-clockwise direction, as viewed from the position of hopper 95, the fans are located off center toward the right edge of the belt 97, as viewed in Fig. 1. The air discharged by fans 98 and 99 blows substantially all particles lighter than gold, such as gold-bearing ore particles, with perhaps some particles of iron or the like, to each side of the belt 97, from which they fall into collecting trough 21 of Figs. 4 and 6. The particles come to rest on the belt 97, as they are fed thereon, and are moved by the belt into the air stream produced by fans 98 and 99. The action of the particles is apparently quite different than if a stream of air were merely directed onto a completely stationary layer of particles, or particles moving relative to the belt or other support therefor, since the air streams must first start the lighter particles moving relative to the belt and then blow them off the belt. Apparently, as soon as a particle starts moving on the belt, it is readily blown off by the air stream. The movement of the belt toward the air stream, i.e., direction of the air stream at an obtuse angle with the direction of movement of the layer, is particularly desirable, since the effect of the air stream appears to be increased, as compared with an air stream directed across the belt. Also, the movement of the belt is preferably as smooth as possible, and vibration of the belt should be avoided in order to prevent any particles from jiggling on the belt and therefore be easier to be started off the belt.

Each of the fans 98 and 99 may be driven by a motor 100, the speed of which, such as up to 5000 r.p.m., is preferably closely controlled, as by a rheostat 101. The fans 98 and 99 are preferably directed downwardly at an angle, such as an angle of 35° between the axis of the fan and the horizontal, although this angle may be changed for different sizes of particles and different particle weights. The peripheral speed of belt 97 may be varied in accordance with separating conditions, such as a peripheral belt speed of between 50 and 150 feet per minute, with a belt speed of approximately 100 feet per minute having been found to be suitable for the final recovery of flake gold from the concentrate produced by fan separation of the sand previously referred to. Belt 97, which is mounted on a fixed roller 102 at one end and a tension adjusting roller 103 at the opposite end, may be driven by a separate motor 104 through fixed roller 102. The speed of motor 104 may be controlled by a rheostat 105, to insure that the optimum separating conditions will be obtained. The fans 88 and 93 may be driven by a motor 109 mounted on a suitable bracket 110 on framework 81, as through a belt 111 of Fig. 5, which drives a shaft 112 for fan 93, and a belt 113 which drives a shaft 114 for fan 88 from shaft 112 through suitable pulleys mounted on the respective shafts 109 and 112. Shafts 112 and 114 may also be mounted on framework 81 in a suitable manner, as by bearings 77'. The motors 100 for fans 98 and 99 and motor 104 for belt 97 are conveniently D.-C. motors, so that the speed thereof may be adjusted by rheostat, although other ways in which speed adjustment can be obtained may be utilized. The motors 109 of the belt separators and the motors 58 and 58' for the fan separators may be D.-C. or A.-C. motors, as is convenient, it being noted that the differences in speeds of the various fans may be secured by using pulleys of approximate diameters for the various belts described previously.

The sizes and speeds of the fans of the separators B to B''', inclusive, found suitable for the sands previously described, are set forth below in Table III, in which the fans 88 are termed upper fans, the fans 93 are termed lower fans and the fans 98 and 99 are termed belt fans.

Table III

| Separator | B | B' | B'' | B''' |
|---|---|---|---|---|
| Upper Fan: | | | | |
| Dia. inches | 12 | 10 | 10 | 8 |
| R.p.m. | 1,750 | 1,750 | 1,150 | 1,000 |
| Lower Fan: | | | | |
| Dia. inches | 12 | 10 | 10 | 8 |
| R.p.m. | 1,750 | 1,750 | 1,150 | 1,000 |
| Belt Fans: | | | | |
| Dia. inches | 6 | 6 | 6 | 6 |

In each of the separations accomplished by a current of air toward which the particles fall, the separating edge is conveniently placed directly beneath the lower edge of the chute from which the particles are discharged. However, the horizontal spacing of each fan from the separating edge and also the vertical spacing of the upper and lower edges of the fan, with respect to the separating edge and the lower edge of the chute from which the particles are discharged, may be varied in accordance with the variations in weight between the lightest and heaviest particles. Thus, for the first separation by the fans 39 to 39''', inclusive, the fans may be spaced farther horizontally from the separating edge and also further below the lower edge of the chute and above the separating edge, with the fans 48 to 48''', inclusive, and the fans 54 to 54''', inclusive, being placed respectively closer horizontally to the separating edge and with the upper and lower edges of the fans vertically closer to the lower end of the chute and the separating edge. Similarly, such spacing may be successively less for the fans 88 and 93 of the belt separators. Of course, individual variations for specific conditions should be utilized.

It will be noted that, as shown in Fig. 4 and in Fig. 6, each hopper or collecting trough for heavier particles is vertically offset from the hopper next above. This construction permits gravity flow of the material from hopper to hopper and also permits a single trough or collector for the lighter particles which are blown past all of the separating edges of each vertical series. Also, by placing the various parts at different elevations, as indicated, flow through the separating elements may take place by gravity, thus reducing the number of moving parts required and reducing both the initial cost of equipment and the operating costs. As long as there is some uniformity in the sizes of the material being supplied to the apparatus, once the speed and diameter of the various fans and the spacing of the fans relative to the chutes and separating edges has been determined, no further changes are necessary, unless there is considerable change in the relative proportions of the particles in any one or more of the various size ranges. However, should there be a change in the amount of particles in any size range or in the relative size or weights of the particles within a particular range, the position of the various fans can be readily adjusted to accommodate normal changes of this character. Thus, if the number of particles or the proportion of heavier particles in any particular size range increases, the fans involved may be moved closer to the separating edge, while if the relative proportion of lighter particles in any particular size range increases, the fans involved may be moved away from the separating edge. In general, except for the largest size range, the heavier the particles and the larger the proportion of heavier particles in any particular size range, then the closer the fans should be placed to the separating edge, both vertically and horizontally. Of course, when an increase in the speed of the air stream is desired, the size or speed of any particular fan may be increased.

It is further to be noted that as more and more lighter material is separated by the fans, from the material flowing through any particular series of hoppers and parts cooperating therewith, the heavier the average particles will become. Thus, by the time the concentrate reaches the belts 97 of the belt separators B to B''', inclusive, all of the waste material will tend to have been removed and the only material remaining will be the heavy gold particles and the slightly less heavy particles of gold-bearing ore. The relative amount of material removed by the first one or two fans will normally be considerably greater than succeeding fans, but the separation need not be as precise, since the proportion of lighter particles still left with the heavier particles permits considerable leeway in the separation for the first few stages. This is an advantage, since the first stages need not be adjusted with precision and therefore can accommodate considerable variation in the feed. Of course, the latter stages of separation, such as that of the fan separators in belt separators B to B''', inclusive, is preferably carried out with greater accuracy than earlier separation stages. However, by the time the material has reached these latter stages, there is considerably less material to be handled and practically all, if not all, of the lightest material for the size range involved has been removed in previous stages. Thus, there is considerably less material handled in the last fan stages and this material tends to vary less in weight than the initial feed. Thus, variations in the feed tend to be taken care of automatically by the first stages of separation and can have considerably less effect on the later stages of separation. Therefore, the latter stages of separation, which are preferably adjusted with greater precision, do not require change or adjustment as often as though the feed thereto varied directly in accordance with variations in the initial feed.

From the foregoing, it will be evident that the method and apparatus of this invention fulfill to a marked degree the requirements and objects hereinbefore set forth. As will be evident, the method and apparatus of this invention are adapted to separate heavier particles from lighter particles in the dry state and due to the stages of separation which are preferably utilized, the final product should be relatively free of less valuable material and the waste or tailings should contain a minimum amount of valuable particles. As will also be evident, the separation operation or operations may be readily controlled and adjusted by adjustment in the size and flow of the air current or other gaseous fluid and adjustment of the relative position of the fans with respect to the chute from which particles are discharged at an angle toward the air stream and the line or separating edge along which lighter particles are separated from heavier particles. As will further be evident, extreme variations in particle sizes of initial feed may be accommodated by separating into ranges of sizes of particles and separately separating the lighter and heavier particles of each range of sizes. It will further be evident that, due to the fact that the particles may be separated in the dry state and that the preferred series of separation stages will permit the final separation to be made more accurately and without continuous adjustment, particularly when sands or ore particles from one source are being treated, the apparatus may be operated at a relatively low cost in comparison with the value of the material recovered.

Although a preferred embodiment of this invention has been illustrated and described with particularity, it will be understood that other embodiments may exist and various changes made therein, all without departing from the spirit and scope of this invention.

What is claimed is:

1. Apparatus for separating in the dry state particles of material having different specific gravities, comprising particle discharge means including an inclined baffle for directing particles flowing thereover downwardly and at an angle to the vertical; a hopper having an outlet and discharge means including a second inclined baffle for directing particles flowing through said outlet and onto said second baffle downwardly and at an angle to the vertical; a fan beneath each said baffle and spaced laterally from said baffle in the direction of downward inclination thereof so as to blow a substantially horizontal stream of air toward the falling particles; a separating edge beneath the lower edge of each said baffle and disposed at an elevation adjacent the elevation of the lower edge of the corresponding fan; means for initially feeding a portion of said particles to said discharge means including said first baffle and the remainder of said particles to said hopper; and means including said first separating edge for causing the heavier particles falling between said separating edge and the corresponding fan to be received by said hopper.

2. Apparatus for separating in the dry state particles having different specific gravities, comprising an upper hopper, two intermediate hoppers and one lower hopper, said upper hopper being provided with two and each said intermediate and lower hopper being provided with one outlet and discharge means including an inclined baffle for directing particles flowing through said outlet onto said baffle downwardly and at an angle to the vertical; said upper hopper having two other outlets through each of which particles flow to one of said intermediate hoppers; a fan disposed beneath each said baffle and spaced laterally from said baffle in the direction of inclination thereof, an edge of each said intermediate hopper being disposed beneath a baffle of one said upper hopper discharge means and at an elevation adjacent the elevation of the lower end of the corresponding fan, and an edge of said lower hopper being disposed beneath the lower edge of said baffle of said discharge means of each said intermediate hopper and at an elevation adjacent the elevation of the lower end of the corresponding fan; and means for receiving lighter particles and means for receiving heavier particles, said receiving means being divided at the upper end by a separating edge disposed beneath the lower end of said baffle of said lower hopper discharge means, so that lighter particles blown past said edges of said intermediate and lower hoppers and said separating edge will fall to said lighter particle receiving means, while heavier particles which are not moved laterally past said edges will fall respectively into said intermediate hoppers, said lower hopper and said heavier particle receiving means.

3. Apparatus for separating in the dry state particles having different specific gravities, comprising a plurality of series of hoppers, fans and receiving means, each as defined in claim 2, the size and spacing of said fans being varied in accordance with the size of particles to be passed through each of said series of hoppers; means for separating said particles having different specific gravities into a plurality of ranges of sizes of particles corresponding to the number of series of hoppers; and means for feeding the particles of each range of size to the upper hopper of the corresponding series.

4. Apparatus for separating in the dry state particles of different specific gravities, comprising a belt having a path including a substantially horizontal portion; means for moving said belt along said path; means for feeding a layer of successive particles onto said belt as it moves along said substantially horizontal path portion; at least one fan having radial blades and mounted above said belt in a position spaced from said feeding means in the direction of movement of said belt along said substantially horizontal path portion, the axis of said fan being inclined downwardly toward said belt in a direction opposite to the direction of movement thereof along said substantially horizontal path portion and the axis of said fan being disposed closer to that side of said belt first approached by said blades as said blades move around and beneath said fan axis; speed adjustable means for rotating said fan; means for receiving particles remaining on said belt after passage beneath said fan; and means for receiving particles moved off each side of said belt by air blown along said belt by said fan.

5. Apparatus for separating in the dry state particles of material having different specific gravities, as defined in claim 4, including a first hopper having discharge means in spaced vertical relation to said belt and including an inclined baffle for directing particles flowing thereover downwardly and at an angle to the vertical; a second hopper having an outlet and discharge means including an inclined baffle for directing particles flowing through said outlet and onto said baffle downwardly and at an angle to the vertical; a fan beneath each said baffle and spaced laterally from said baffle in the direction of inclination thereof so as to blow a substantially horizontal stream of air toward the falling particles; a separating edge beneath the lower edge of each said baffle and disposed at an elevation adjacent the elevation of the lower edge of the corresponding fan; means for initially feeding particles to said first hopper; means including said first separating edge for causing the heavier particles falling between said separating edge and the corresponding fan to be received by said second hopper; and means including said second separating edge for causing the heavier particles falling between said separating edge and the corresponding fan to be received by said belt feeding means.

6. Apparatus for separating in the dry state particles having different specific gravities, comprising means for separating said particles in accordance with size so as to produce a plurality of batches, with each batch composed of particles of a different size range than each other batch; a framework; a series of hoppers for each batch mounted in side by side relationship on said framework, each series including an upper hopper, two intermediate hoppers and one lower hopper; means for feeding each batch of particles to the upper hopper of the corresponding series; each said upper hopper being provided with two and each said intermediate and lower hopper being provided with one outlet and a discharge chute including an inclined baffle for directing particles flowing through said outlet onto said baffle downwardly and at an angle to the vertical; each said upper hopper having two other outlets through each of which particles flow to one of said intermediate hoppers of said series; a fan disposed beneath each said baffle and spaced laterally from said baffle in the direction of inclination thereof, an edge of each said intermediate hopper being disposed beneath a baffle of one said upper hopper of said series and at an elevation adjacent the elevation of the lower end of the corresponding fan; an edge of each said lower hopper being disposed beneath the lower edge of said baffle of both said intermediate hoppers of said series and at an elevation adjacent the elevation of the lower end of the corresponding fan; a chute for receiving lighter particles and a chute for receiving heavier particles for each said series, said chutes for each said series being divided at the upper end by a separating edge disposed beneath the lower end of said baffle of said lower hopper discharge chute of said series so that lighter particles blown past said edges of said intermediate and lower hoppers and said separating edge of said series will fall to said lighter particle receiving chute, while heavier particles which are not moved laterally past said edges will fall respectively into said intermediate hoppers, said lower hopper and said heavier particle receiving chute; and a belt movable alongside said framework for removing separated lighter particles, each said lighter particle receiving chute being positioned to discharge onto said belt.

7. Apparatus for separating in the dry state particles having different specific gravities, comprising an upper hopper, an intermediate hopper and a lower hopper, said upper hopper and said intermediate hopper being provided with an outlet and discharge means including an inclined baffle for directing particles flowing through said outlet downwardly and at an angle to the vertical; a fan disposed beneath each said baffle and spaced laterally from said baffle in the direction of inclination thereof, an edge of said intermediate hopper being disposed beneath the baffle of said upper hopper discharge means and at an elevation adjacent the elevation of the lower end of the corresponding fan, and an edge of said lower hopper being disposed beneath the lower edge of said baffle of said discharge means of said intermediate hopper and at an elevation adjacent the elevation of the lower end of the corresponding fan; a chute for receiving lighter particles, and extending to said separating edge of said lower hopper, so that lighter particles blown past said edges of said intermediate and lower hoppers will fall to said lighter particle receiving chute, while heavier particles which are not moved laterally past said edges will fall respectively into said intermediate hoppers and said lower hopper; said lower hopper having an outlet for discharging particles therefrom in a laterally extended stream; a pair of pulleys disposed longitudinally forwardly and rearwardly from said lower hopper; a belt movable over said pulleys and having a path including a substantially horizontal portion extending longitudinally beneath said lower hopper; means for moving said belt along said path, so that a layer of successive particles is fed onto said belt from said lower hopper as said belt moves along said substantially horizontal path portion; a pair of fans having radial blades and mounted above said belt in successive longitudinal positions spaced from said feeding means in the direction of movement of said belt along said substantially horizontal path portion, the axis of each said fan being inclined downwardly toward said belt in a direction opposite to the direction of movement thereof along said substantially horizontal path portion and the axis of each said fan being disposed closer to that side of said belt first approached by said blades as said blades move around and beneath said fan axis; speed adjustable means for rotating said fan; a pan for receiving particles remaining on said belt after passage beneath said fans; and a trough beneath said belt for receiving particles moved off each side of said belt by air blown along said belt by said fans.

References Cited in the file of this patent

UNITED STATES PATENTS

| | | |
|---|---|---|
| 7,029 | Straub | Jan. 15, 1850 |
| 197,897 | Rice | Dec. 4, 1877 |
| 253,771 | Sebillot | Feb. 14, 1882 |
| 775,965 | Edison | Nov. 29, 1904 |
| 1,192,159 | Baluvelt et al. | July 25, 1916 |
| 2,214,434 | Nelms | Sept. 10, 1940 |

FOREIGN PATENTS

| | | |
|---|---|---|
| 557,181 | Great Britain | Nov. 9, 1943 |